May 8, 1962

E. B. KNOTT 3,033,681

MEROCYANINE SENSITIZING DYES AND SENSITIZED
PHOTOGRAPHIC EMULSIONS

Filed Jan. 19, 1959

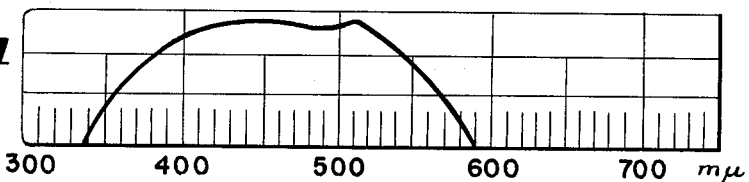

Fig. 1

4-(3-ETHYLBENZOXAZOLIN-2-YLIDENE-ETHYLIDENE)-
2':3'- DIHYDRO-5- OXOBENZOTHIAZOLO- 2':3'- 2:1-
GLYOXALINE

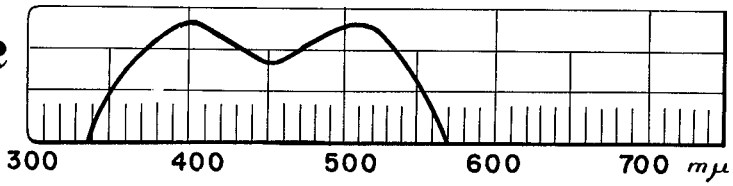

Fig. 2

4-(3- ETHYLBENZOXAZOLIN-2- YLIDENE- ETHYLIDENE)-
2':3'- DIHYDRO-5- OXOBENZOTHIAZOLO- 2':3'- 2:1 -
GLYOXALINE METHYLSULFATE

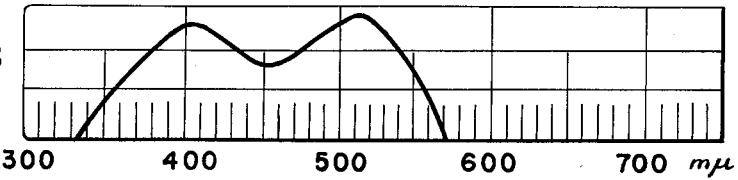

Fig. 3

4-(3-METHYLTHIAZOLIDIN-2- YLIDENE-ETHYLIDENE)- 2':3'-
DIHYDRO-5-OXOBENZOTHIAZOLO- 2':3'- 2:1 GLYOXALINE

Edward B. Knott
INVENTOR.

BY R. Frank Smith
Lawrence H. Willis
ATTORNEYS

United States Patent Office 3,033,681
Patented May 8, 1962

3,033,681
MEROCYANINE SENSITIZING DYES AND SENSITIZED PHOTOGRAPHIC EMULSIONS
Edward B. Knott, Wealdstone, England, assignor to Eastman Kodak Company, Rochester, N.Y., a corporation of New Jersey
Filed Jan. 19, 1959, Ser. No. 787,493
16 Claims. (Cl. 96—102)

This invention relates to novel polymethine dyes of the merocyanine class, methods for making such dyes, and photographic silver halide emulsions sensitized by means of such polymethine dyes.

Polymethine dyes of the merocyanine types have been previously described, wherein the molecule contains a variety of acidic heterocyclic nuclei. I have found a new class of merocyanine dyes containing a complex acidic nucleus, the nitrogen atom of which can be quaternated to provide derivatives which also have useful properties. Many of the dyes described in the following examples are useful in increasing the sensitivity of photographic silver halide emulsions.

It is, therefore, an object of my invention to provide a new class of merocyanine dyes. Another object is to provide methods for making such merocyanine dyes. Still another object is to provide quaternated derivatives of the aforesaid merocyanine dyes and a method for making such quaternated derivatives. Yet, another object of my invention is to provide photographic silver halide emulsions spectrally sensitized with the new merocyanine dyes of my invention. Other objects will become apparent from a consideration of the following description and examples.

My new merocyanine dyes can frequently be employed in sensitizing photographic silver halide emulsions to a useful degree, and the effect of three of these dyes of my invention in conventional photographic silver halide emulsions is illustrated diagrammatically in FIGURES 1 to 3 of the accompanying drawing. Further details regarding this effect are given below.

The new merocyanine dyes of my invention include dyes represented by the following general formulas:

(I)
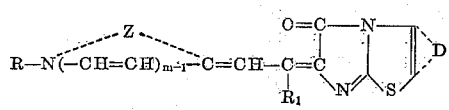

(II)
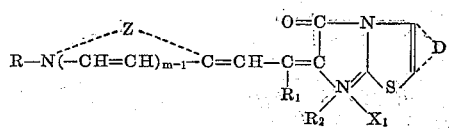

wherein R and $R_2$ each represents an alcohol radical, i.e., a substituted or unsubstituted alkyl group, such as methyl, ethyl, n-propyl, n-butyl, isobutyl, benzyl (phenylmethyl), β-hydroxyethyl, etc. (e.g., an alkyl group containing from about 1 to 7 carbon atoms), $R_1$ represents a hydrogen atom, a lower alkyl group (e.g., methyl, ethyl, etc.), or an aryl group (e.g., phenyl, tolyl, etc.), $X_1$ represents an acid radical, such as methylsulfate, ethylsulfate, p-toluenesulfonate, benzenesulfonate, iodide, chloride, bromide, etc., D represents the non-metallic atoms necessary to complete a benzene ring, which may or may not contain substituents, such as alkoxyl (e.g., methoxyl, ethoxyl, etc.), alkyl (e.g., methyl, ethyl, etc.), etc., m represents a positive integer of from 1 to 2 and Z represents the non-metallic atoms necessary to complete a heterocyclic nucleus containing from 5 to 6 atoms in the heterocyclic ring, such as those selected from the group consisting of a thiazole nucleus (e.g., thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, etc.), a benzothiazole nucleus (e.g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), a naphthothiazole nucleus (e.g., naphtho[1,2]-thiazole, naphtho[2,1]thiazole, 5-methoxynaphtho[2,1]thiazole, 5-ethoxynaphtho[2,1]thiazole, 8-methoxynaphtho[1,2]thiazole, 7-methoxynaphtho[1,2]thiazole, etc.), a thianaphtheno-7′,6′,4,5-thiazole nucleus (e.g., 4′-methoxythianaphtheno-7′,6′,4,5-thiazole, etc.), an oxazole nucleus (e.g., 4-methyloxazole, 5-methyloxazole, 4-phenyloxazole, 4,5-diphenyloxazole, 4-ethyloxazole, 4,5-dimethyloxazole, 5-phenyloxazole, etc.), a benzoxazole nucleus (e.g., benzoxazole, 5-chlorobenzoxazole, 5-methylbenzoxazole, 5-phenylbenzoxazole, 6-methylbenzoxazole, 5,6 - dimethylbenzoxazole, 4,6 - dimethylbenzoxazole, 5 - methoxybenzoxazole, 5 - ethoxybenzoxazole, 5-chlorobenzoxazole, 6-methoxybenzoxazole, 5-hydroxybenzoxazole, 6-hydroxybenzoxazole, etc.), a naphthoxazole nucleus (e.g., naphtho[1,2]oxazole, naphtho[2,1]oxazole, etc.), a selenazole nucleus (e.g. 4-methylselenazole, 4-phenylselenazole, etc.), a benzoselenazole nucleus (e.g., benzoselenazole, 5-chlorobenzoselenazole, 5-methoxybenzoselenazole, 5-hydroxybenzoselenazole, tetrahydrobenzoselenazole, etc.), a naphthoselenazole nucleus (e.g., naphtho[1,2]selenazole, naphtho[2,1]selenazole, etc.), a thiazoline nucleus (e.g., thiazoline, 4-methylthiazoline, etc.), a 2-quinoline nucleus (e.g., quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), a 4-quinoline nucleus (e.g., quinoline, 6-methoxyquinoline, 7-methylquinoline, 8-methylquinoline, etc.), a 1-isoquinoline nucleus (e.g., isoquinoline, 3-4-dihydroisoquinoline, etc.), a benzimidazole nucleus (e.g., 1,3-diethylbenzimidazole, 1-ethyl-3-phenylbenzimidazole, etc.), a 3,3-dialkylindolenine nucleus (e.g., 3,3-dimethylindolenine, 3,3,5-trimethylindolenine, 3,3,7-trimethylindolenine, etc.), a 2-pyridine nucleus (e.g., pyridine, 5-methylpyridine, etc.), a 4-pyridine nucleus (e.g., pyridine, etc.), etc.

The dyes of Formula II above will be recognized as the quaternated dyes of Formula I, and these quaternated derivatives can be prepared by simply heating together the dyes of Formula I with an alkyl salt selected from those represented by the following general formula:

(IIa)    $R_2—X_1$ wherein $R_2$ and $X_1$ have the values given above. The technique of quaternation is well known and is illustrated with respect to the present invention in the following examples.

The merocyanine dyes of Formula I above, wherein $R_1$ represents a hydrogen atom can be prepared by condensing a compound selected from those represented by the following general formula:

(III)
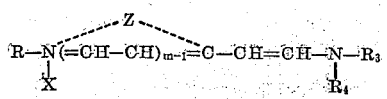

wherein R, m and Z each have the values given above, $R_3$ represents an acyl group (e.g., acetyl, propionyl, butyryl, benzoyl, etc.), $R_4$ represents an aryl group (e.g., phenyl, tolyl, etc.) and X represents an acid radical or anion, such as those listed above with respect to $X_1$, with a compound selected from those represented by the following general formula:

(IV) 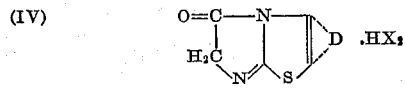

wherein D has the values given above and $X_2$ represents an acid radical, such as those listed above with respect to $X_1$.

The merocyanine dyes of my invention represented by Formula I above, wherein $R_1$ represents an alkyl or aryl group, can be prepared by condensing together a compound of the following general formula:

(IIIa) 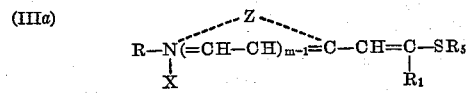

wherein R, $R_1$, X, m and Z each have the values given above, and $R_5$ represents an alkyl group (e.g., methyl, ethyl, etc.), or an aryl group (e.g., phenyl, tolyl, etc.) with a compound of Formula IV.

In general, the condensation of the compounds of Formula III or Formula IIIa with those of Formula IV can be accelerated by heating, although temperatures from ambient temperatures (ca. 20° C.) to the reflux temperature of the reaction mixture, can be employed. Also, the condensations can be carried out in the presence of an inert solvent, if desired. Typical inert solvents include pyridine, benzene, ethanol, propanol, isopropanol, butanol, isobutanol, etc. The condensations can be accelerated further by means of a basic condensing agent, such as the lower trialkylamines (e.g., triethylamine, tripropylamine, triisopropylamine, tributylamine, triisobutylamine, etc.), the N,N-dialkylanilines (e.g., dimethylaniline, diethylaniline, etc.), the N-alkylpiperidines (e.g., N-methylpiperidine, N-ethylpiperidine, etc.), etc.

The intermediates of Formula IV above can be prepared by heating together a compound of the following general formula:

(V) 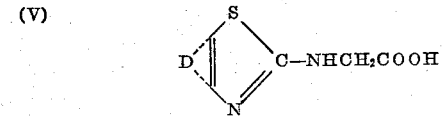

wherein D has the values given above with an acidic condensing agent, such as phosphorus trichloride. The ring formation of the compounds of Formula V can be carried out in the presence of an inert diluent, such as dioxan, diethyl ether, etc.

The compounds of Formula V above can advantageously be prepared by heating glycine in an alkaline medium containing a compound of the following general formula:

(VI) 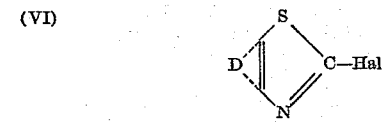

wherein D has the values given above and Hal represents a halogen atom, such as chlorine, bromine, etc. The condensations can be accelerated by means of a basic condensing agent, such as the trialkylamines (e.g., triethylamine, tripropylamine, triisopropylamine, etc.).

The following examples will serve to illustrate further the method of preparing dyes according to my invention. The examples also illustrate the sensitizing properties of certain of the dyes prepared according to my invention.

*Example 1.—N-Benzothiazol-2-Ylglycine*

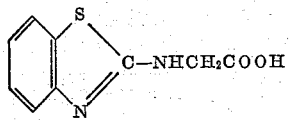

2-chlorobenzothiazole (8.5 g.) was added to a solution of potassium hydroxide (5.6 g.) and glycine (7.5 g.) in water (50 cc.). Triethylamine (7.5 cc.) and ethanol (50 cc.) were added and the whole was refluxed for 24 hours. The solution was evaporated to dryness. The residue was boiled up with ethanol and the solid collected. It (7.0 g., 67%) formed felted needles from water or ethylene glycol, M.P. 201–202° C.

*Example 2.—2':3'-Dihydro-5-Oxobenzothiazole-2':3'-2:1-Glyoxaline Hydrochloride*

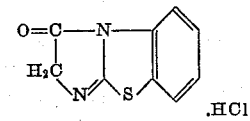

N-benzothiazolylglycine (1.05 g.) was covered with dioxan (10 cc.) and phosphorus trichloride (5 cc.) was added and the whole refluxed on a steam bath for 30 minutes. The glycine softened then resolidified. The solvent was decanted and the solid washed with ether and was used directly in the dye condensations.

The use of phosphorus tribromide instead of the trichloride results in the formation of the corresponding hydrobromide.

*Example 3.—4-(3-Ethylbenzoxazolin-2-Ylidene-Ethylidene)-2':3'-Dihydro-5-Oxobenzothiazolo-2':3'-2:1-Glyoxaline*

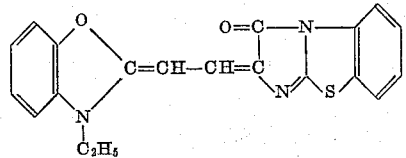

The product of Example 2 (from 1.05 g. of N-benzothiazol-2-ylglycine), 2-(2'-acetanilidovinyl)-3-ethylbenzoxazolium iodide (2.1 g.), ethanol (20 cc.) and triethylamine (3 cc.) were refluxed together for 15 minutes. The dye was collected after chilling, extracted with hot benzene, the benzene solution was concentrated to 10 cc. and hot ethanol (20 cc.) was added. The dye (0.6 g.) formed orange crystals, M.P. 268° C.

It sensitized a silver chlorobromide emulsion with a peak at 530 mμ extending to 580 mμ and a silver iodobromide emulsion with a peak at 530 mμ extending to 570 mμ when added at a rate of 0.1 g./mole silver halide.

*Example 4.—4-(3-Ethylbenzoxazolin-2-Ylidene-Ethylidene)-2':3'-Dihydro-3-Methyl-5-Oxobenzothiazolo-2':3'-2:1-Glyoxalinium Methylsulfate*

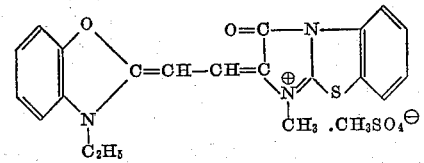

The product of Example 3 (0.9 g.) and methylsulfate (1 cc.) were fused at 120° C. for 10 minutes. The whole had then solidified. It was dissolved in ethanol, the solution filtered from any unquaternized dye and then chilled. The dye (1.2 g.) which crystallized formed soft orange crystals, M.P. 272° C. (decomp.).

At 0.1 g./mole silver halide it was a powerful sensitizer for silver chlorobromide emulsions with a peak at 530 mμ extending to 560 mμ and of silver iodobromide emulsions with a peak at 540 mμ extending to 560 mμ.

*Example 5.—4 - (3 - Ethylbenzoxazolin - 2-Ylidene-Ethylidene) - 3 - Ethyl - 2':3' - Dihydro-5-Oxobenzothiazolo-2':3'-2:1-Glyoxalinium Iodide*

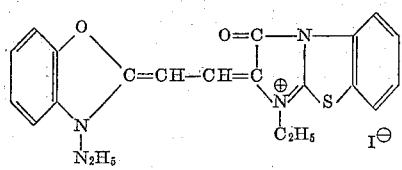

The product of Example 3 (0.6 g.) and ethylsulfate (1.0 cc.) were fused at 120° C. for 4 hours. Methanol (25 cc.) was added and the suspension was refluxed to dissolve the quaternized dye. The unchanged precurser was filtered off and a saturated aqueous potassium iodide solution (1 cc.) was added. The orange needles which separated were recrystallized from methanol-ether. The required iodide (0.4 g., 46.5%) formed fine orange threads, M.P. 263° C.

Sensitizing data were very similar to those of Example 4.

*Example 6.—4 - (3 - Methylthiazolidin - 2-Ylidene-Ethylidene) - 2':3' - Dihydro-5-Oxobenzothiazolo-2':3'-2:1-Glyoxaline*

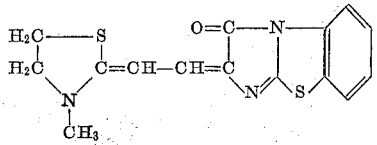

The product of Example 2 (from 4.2 g. of N-benzothiazol-2-ylglycine), 2-(2'-acetanilidovinyl)-3-methyl thiazolinium iodide (7.8 g.), nitrobenzene (20 cc.) and triethylamine (6 cc.) were heated together on a steam bath for 40 minutes. Ethanol (40 cc.) was added and the dye was collected. It (4.4 g., 70%) was dissolved in pyridine (10 cc.) and hot ethanol (25 cc.) added. The rust needles (1.85 g., 29%) which separated had M.P. 246–247° C.

At 0.1 g./mole silver halide it sensitized a silver chlorobromide emulsion with a peak at 530 mμ extending to 560 mμ and a silver iodobromide emulsion with a peak at 530 mμ extending to 560 mμ.

*Example 7.—4 - (3 - Methylthiazolidin - 2-Ylidene-Ethylidene) - 2':3' - Dihydro-3-Methyl-5-Oxobenzothiazolo-2':3'-2:1-Glyoxalinium Methylsulfate*

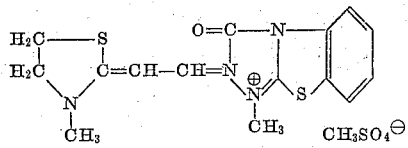

The product of Example 6 (1.05 g.) and methyl sulfate (1.5 cc.) were fused at 130° C. for 10 minutes. The quaternized dye was washed with benzene dissolved in methanol (25 cc.), ethanol (15 cc.) was added and the solution then concentrated to 15 cc. Orange needles, M.P. 220–221° C. (1.4 g.) separated on chilling.

At 0.1 g./mole silver halide it sensitized strongly a silver chlorobromide emulsion with a peak at 510 mμ extending to 540 mμ and a silver iodobromide with a peak at 510 mμ extending to 540 mμ.

*Example 8.—4-(3-Ethyl-4:5-Diphenyloxazolin-2-Ylidene-Ethylidene) - 2':3' - Dihydro-5-Oxobenzothiazolo-2':3'-2:1-Glyoxaline*

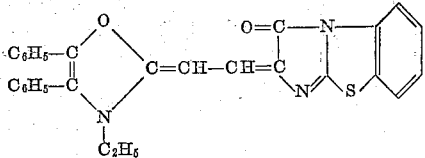

The product of Example 2 (from 2.2 g. of N-benzothiazol-2-ylglycine), 2,2'-anilinovinyl-3-ethyl-4:5-diphenyloxazolium toluene-p-sulfonate (5.5 g.), nitrobenzene (40 cc.), triethylamine (8 cc.), and acetic anhydride (1.5 cc.) were heated together on a steam bath for 40 minutes. Ethanol (100 cc.) was added and the whole chilled for 3 days. The required dye (1.1 g.) separated and formed red or yellow needles from pyridine-ethanol or orange prisms from benzene, decomp. 247° C. onwards.

*Example 9.—4-(3-Ethyl-4:5-Diphenyloxazolin-2-Ylidene-Ethylidene) - 2':3' - Dihydro-3-Methyl-5-Oxobenzothiazolo-2':3'-2:1-Glyoxalinium Iodide*

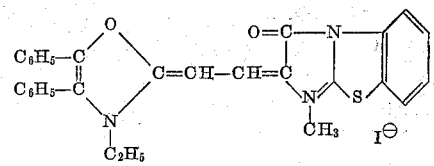

The product of Example 8 (0.15 g.) and methyl toluene-p-sulfonate (0.15 g.) were fused together at 120° C. for 30 minutes. The quaternized base was then dissolved in ethanol, filtered and a saturated aqueous potassium iodide solution (0.1 cc.) was added. The dye iodide which had precipitated was dissolved in methanol, and an equal volume of ethanol was added and the solution concentrated until crystallization set in. It (0.14 g., 71%) formed orange prisms, M.P. 282° C.

At 0.1 g./mole silver halide it sensitized strongly a silver chlorobromide emulsion with a peak at 530 mμ extending to 560 mμ and a silver iodobromide emulsion with a peak at 540 mμ extending to 560 mμ.

*Example 10.—6-Ethoxy-N-Benzothiazol-2-Ylglycine*

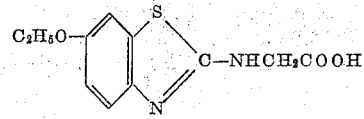

Potassium hydroxide (4.96 g.) was dissolved in water (45 cc.), glycine (6.6 g.) and 2-chloro-6-ethoxybenzothiazole (M.P. 65–67° C., cf. J. Amer. Chem. Soc., 1949, 71, 3417) (9.5 g.) were added followed by triethylamine (6.6 cc.) and ethanol (45 cc.). The whole was refluxed on a steam bath for 8 days when a sample remained clear on dilution with water. The solvent was removed under reduced pressure, ethanol (20 cc.) was added, boiled up and the salts were collected. They were dissolved in water (65 cc.) and glacial acetic acid (5.3 cc.) was added to give a white crystalline meal. From ethanol the hydrate formed white crystals M.P. 153° C. (depending on the rate of heating) the melt resolidified darkened at ca. 265° C. Yield 4.75 g.

*Example 11. — 6'-Ethoxy-4-(3-Ethylbenzoxazolin-2-Ylidenethylidene) - 2':3' - Dihydro - 5 - Oxobenzothiazolo-2':3'-2':1-Glyoxaline*

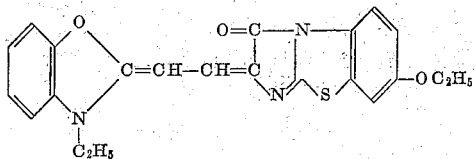

The product of Example 10 (2.6 g.) was covered with dioxan (20 cc.) and phosphorus trichloride (10 cc.) was added and the whole was refluxed for 30 minutes on a steam bath. The solvent was decanted and the grains were washed with ether. 2-(2'-acetanilidovinyl)benzoxazole ethiodide (4.4 g.) pyridine (25 cc.) and triethylamine (5 cc.) were added and the whole was heated for one hour on a steam bath. Ethanol (70 cc.) was added and the flask was chilled overnight. The dye was collected and extracted in a Soxhlet thimble with benzene.

The benzene-soluble dye was collected after chilling and from pyridine-methanol it (0.8 g.) formed a brick-red powder M.P. 271° C. (previous softening).

*Example 12.—6'-Ethoxy-4-(3-Ethylbenzoxazolin-2-Ylidenethylidene)-2':3'-Dihydro-3-Methyl-5-Oxobenzothiazolo-2':3'-2:1-Glyoxalinium Methylsulfate*

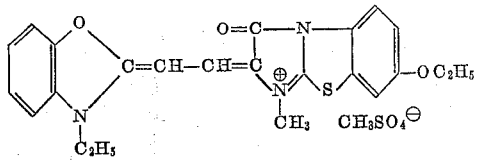

The product of Example 11 (0.8 g.) and methyl sulfate (1 cc.) were fused together at 120° C. for 10 minutes. The whole solidified after 2–3 minutes. The solid quaternary salt was dissolved in boiling methanol, the solution was filtered from any unquaternized dye and an equal volume of ethanol was added. The solution was then concentrated until crystallization set in. It (1.0 g.) formed orange threads M.P. 268° C.

It sensitized a silver chloro-bromide emulsion strongly with a peak at 530 mμ extending to 560 mμ.

As shown in the above examples, many of the dyes of my invention are particularly useful in manufacturing photographic, silver halide emulsions, serving to alter the sensitivity thereof. Sensitization by means of my new dyes is, of course, directed primarily to the ordinarily-employed, gelatino-silver-halide, developing-out emulsions. The dyes are advantageously incorporated in the washed, finished emulsion and should, of course, be uniformly distributed throughout the emulsion. In the preparation of photographic emulsions containing my new dyes, it is only necessary to disperse the dyes in the emulsions. The methods of incorporating dyes in emulsion are simple and well known to those skilled in the art of emulsion making. It is convenient to add the dyes from solutions in appropriate solvents. The solvent must, of course, be compatible with the emulsion and substantially free from any deleterious effect on the light-sensitive materials. Pyridine has proven satisfactory as a solvent for many of my new dyes.

The concentration of my new dyes in the emulsion can vary widely, i.e., from about 5 to about 200 mgs. per liter of flowable emulsion. The concentration of the dye will vary according to the type of light-sensitive material in the emulsion and according to the effects desired. The suitable and most economical concentration for any given emulsion will be apparent to those skilled in the art upon making the ordinary tests and observations customarily used in the art of emulsion making.

To prepare a gelatino-silver-halide emulsion sensitized with one of my new dyes, the following procedure is satisfactory: A quantity of the dye is dissolved in pyridine or other suitable solvent and a volume of this solution (which may be diluted with methanol) containing from 5 to 200 mgs. of dye is slowly added to about 1000 cc. of a gelatino-silver-halide emulsion, with stirring. Stirring is continued until the dye is uniformly distributed throughout the emulsion. With most of my new dyes, 10 to 100 mgs. of dye per liter of emulsion suffices to produce the maximum sensitizing effect with the ordinary gelatino-silver-bromide (including bromiodide) emulsions. With fine-grain emulsions, which include most of the ordinarily-employed gelatino-silver-chloride emulsions, somewhat larger concentrations of dye may be necessary to secure the optimum sensitizing effect.

The above statements are only illustrative and are not to be understood as limiting my invention in any sense, as it will be apparent that my new dyes can be incorporated by other methods in many of the photographic silver halide emulsions customarily employed in the art. For instance, the dyes can be incorporated by bathing a plate or film upon which an emulsion has been coated, in the solution of the dye, in an appropriate solvent. Bathing methods, however, are not to be preferred ordinarily.

Photographic silver halide emulsions which can advantageously be sensitized by means of the new dyes of my invention comprise the customarily-employed gelatino-silver-chloride, gelatino-silver-chlorobromide, gelatino-silver-bromide, and gelatino-silver-bromiodide developing-out emulsions.

Photographic silver halide emulsions such as those listed above, containing the sensitizing dyes of my invention can also contain such addenda as chemical sensitizers, e.g., sulfur sensitizers (e.g., allyl thiocarbamide, thiourea, allylisothiocyanate, cystine, etc.), various gold compounds (e.g., potassium chloroaurate, auric trichloride, etc.) (see U.S. patents W. D. Baldsiefen 2,540,085, granted February 6, 1951; R. E. Damschroder 2,597,856, granted May 27, 1952, and H. C. Yutzy et al. 2,597,915, granted May 27, 1952), various palladium compounds, such as palladium chloride (W. D. Baldsiefen U.S. 2,540,086, granted February 6, 1951), potassium chloropalladate (R. E. Stauffer et al. U.S. 2,598,079, granted May 27, 1952), etc., or mixtures of such sensitizers; antifoggants, such as ammonium chloroplatinate (A. P. H. Trivelli et al. U.S. 2,566,245, granted August 28, 1951), ammonium chloroplatinite (A. P. H. Trivelli et al. U.S. 2,566,263, granted August 28, 1951), benzotriazole, nitrobenzimidazole, 5-nitroindazole, benzidine, mercaptans, etc. (see Mees—"The Theory of the Photographic Process," Macmillan Pub., 1942, page 460), or mixtures thereof; hardeners, such as formaldehyde (A. Miller U.S. 1,763,533, granted June 10, 1930), chrome alum (U.S. 1,763,533), glyoxal (J. Brunken U.S. 1,870,354, granted August 9, 1932), dibromacrolein (O. Block et al. Br. 406,750, accepted March 8, 1934), etc.; color couplers, such as those described in I. F. Salminen et al. U.S. Patent 2,423,730, granted July 7, 1947, Spence and Carroll U.S. Patent 2,640,776, issued June 2, 1953 etc.; or mixtures of such addenda. Dispersing agents for color couplers, such as those set forth in U.S. patents E. E. Jelly et al. 2,322,027, granted June 15, 1943, and L. D. Mannes et al. 2,304,940, granted December 15, 1942, can also be employed in the above-described emulsions.

The accompanying drawing further illustrates my invention. Each figure is a diagrammatic reproduction of a spectrogram showing the sensitivity of an ordinary gelatino-silver-chlorobromide emulsion containing one of my new sensitizing dyes. In FIGURE 1, the curve depicts a sensitivity of an ordinary gelatino-silver-chlorobromide emulsion containing 4-(3-ethylbenzoxazolin-2-ylidene-ethylidene)-2':3'-dihydro-5-oxobenzothiazole-2':3'-2:1-glyoxaline. The preparation of this dye is illustrated in Example 3 above.

In FIGURE 2, the curve depicts the sensitivity of an ordinary gelatino-silver-chlorobromide emulsion containing 4-(3-ethylbenzoxazolin-2-ylidene-ethylidene)-2':3'-dihydro-3-methyl-5-oxobenzothiazolo-2':3'-2:1-glyoxalinium methylsulfate. The preparation of this dye is illustrated in Example 4 above.

In FIGURE 3, the curve depicts the sensitivity of an ordinary gelatino-silver-chlorobromide emulsion containing 4-(3-methylthiazolidin-2-ylidene-ethylidene)-2':3'-dihydro-5-oxobenzothiazolo-2':3'-2:1-glyoxaline. The preparation of this dye is illustrated in Example 6 above.

The invention has been described in detail with particular reference to preferred embodiments thereof, but it will be understood that variations and modifications can be effected within the spirit and scope of the invention as described hereinabove and as defined in the appended claims.

What I claim as my invention and desire secured by Letters Patent of the United States is:

1. A photographic silver halide emulsion sensitized with a merocyanine dye selected from the class consisting of those represented by the following general formulas:

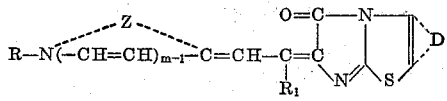

and

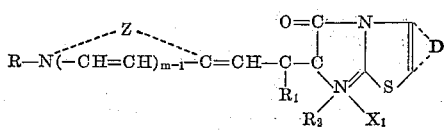

wherein R and $R_2$ each represents an alkyl group containing from 1 to 7 carbon atoms, $R_1$ represents a member selected from the class consisting of a hydrogen atom, a lower alkyl group and an aryl group, $X_1$ represents an acid radical, D represents the atoms necessary to complete a monocyclic arylene group containing from 6 to 8 carbon atoms, m represents a positive integer of from 1 to 2 and Z represents the non-metallic atoms necessary to complete a heterocyclic nucleus selected from the class consisting of a thiazole nucleus, a benzothiazole nucleus, a naphthothiazole nucleus, a thianaphtheno-7',6',4,5-thiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a 2-quinoline nucleus, a 4-quinoline nucleus, a 1-isoquinoline nucleus, a benzimidazole nucleus, a 3,3-dialkylindolenine nucleus, a 2-pyridine nucleus and a 4-pyridine nucleus 2. A photographic silver halide emulsion as defined in claim 1 wherein said silver halide is silver chlorobromide.

3. A photographic silver halide emulsion as defined in claim 1 wherein said silver halide is silver iodobromide.

4. A photographic silver halide developing-out emulsion sensitized with a merocyanine dye selected from those represented by the following general formula:

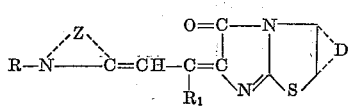

wherein R represents an alkyl group containing from 1 to 7 carbon atoms, $R_1$ represents a member selected from the class consisting of a hydrogen atom, a lower alkyl group and a monocyclic aryl group of the benzene series, D represents the atoms necessary to complete a monocyclic arylene group containing from 6 to 8 carbon atoms, and Z represents the non-metallic atoms necessary to complete a heterocyclic nucleus selected from the class consisting of those of the benzoxazole series, those of the thiazoline series and those of the oxazole series.

5. A photographic silver halide developing-out emulsion sensitized with a merocyanine dye selected from those represented by the following general formula:

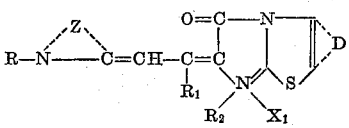

wherein R and $R_2$ each represents an alkyl group containing from 1 to 7 carbon atoms, $R_1$ represents a member selected from the class consisting of a hydrogen atom, a lower alkyl group and a monocyclic aryl group of the benzene series, $X_1$ represents an acid radical, D represents the atoms necessary to complete a monocyclic arylene group containing from 6 to 8 carbon atoms and Z represents the non-metallic atoms necessary to complete a heterocyclic nucleus selected from the class consisting of those of the benzoxazole series, those of the thiazoline series and those of the oxazole series.

6. A photographic silver halide developing-out emulsion sensitized with a merocyanine dye selected from those represented by the following general formula:

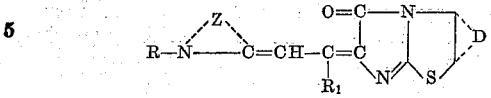

wherein R represents an alkyl group containing from 1 to 7 carbon atoms, $R_1$ represents a member selected from the class consisting of a hydrogen atom, a lower alkyl group and a monocyclic aryl group of the benzene series, D represents the atoms necessary to complete a monocyclic arylene group containing from 6 to 8 carbon atoms, and Z represents the non-metallic atoms necessary to complete a heterocyclic nucleus of the benzoxazole series.

7. A photographic silver halide developing-out emulsion sensitized with a merocyanine dye represented by the following formula:

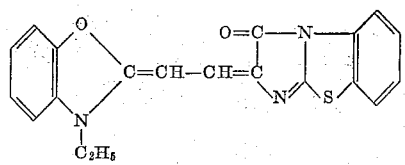

8. A photographic silver halide developing-out emulsion sensitized with a merocyanine dye selected from those represented by the following general formula:

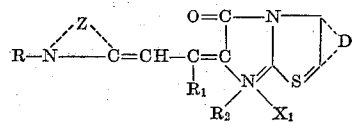

wherein R and $R_2$ each represents an alkyl group containing from 1 to 7 carbon atoms, $R_1$ represents a member selected from the class consisting of a hydrogen atom, a lower alkyl group and a monocyclic aryl group of the benzene series, $X_1$ represents an acid radical, D represents the atoms necessary to complete a monocyclic arylene group containing from 6 to 8 carbon atoms and Z represents the non-metallic atoms necessary to complete a heterocyclic nucleus of the benzoxazole series.

9. A photographic halide developing-out emulsion sensitized with a merocyanine dye represented by the following formula:

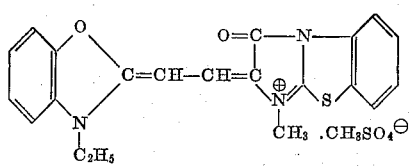

10. A photographic halide developing-out emulsion sensitized with a merocyanine dye represented by the following formula:

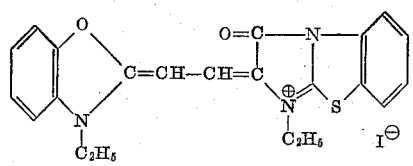

11. A photographic silver halide developing-out emulsion sensitized with a merocyanine dye selected from those represented by the following general formula:

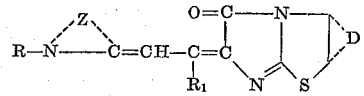

wherein R represents an alkyl group containing from 1 to 7 carbon atoms, $R_1$ represents a member selected from the class consisting of a hydrogen atom, a lower alkyl group and a monocyclic aryl group of the benzene series, D represents the atoms necessary to complete a monocyclic arylene group containing from 6 to 8 carbon atoms, and Z represents the non-metallic atoms necessary to complete a heterocyclic nucleus of the thiazoline series.

12. A photographic silver halide developing-out emulsion sensitized with a merocyanine dye represented by the following formula:

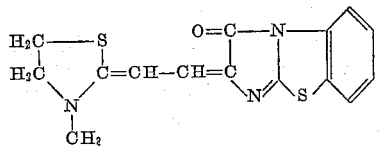

13. A photographic silver halide developing-out emulsion sensitized with a merocyanine dye selected from those represented by the following general formula:

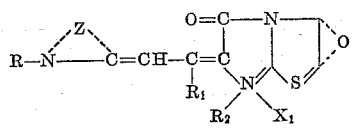

wherein R and $R_2$ each represents an alkyl group containing from 1 to 7 carbon atoms, $R_1$ represents a member selected from the class consisting of a hydrogen atom, a lower alkyl group and a monocyclic aryl group of the benzene series, $X_1$ represents an acid radical, D represents the atoms necessary to complete a monocyclic arylene group containing from 6 to 8 carbon atoms and Z represents the non-metallic atoms necessary to complete a heterocyclic nucleus of the thiazoline series.

14. A photographic silver halide developing-out emulsion sensitized with a merocyanine dye represented by the following formula:

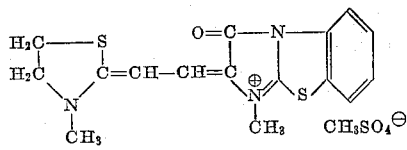

15. A photographic silver halide developing-out emulsion sensitized with a merocyanine dye selected from those represented by the following general formula:

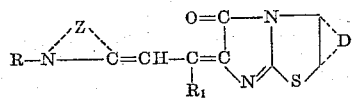

wherein R represents an alkyl group containing from 1 to 7 carbon atoms, $R_1$ represents a member selected from the class consisting of a hydrogen atom, a lower alkyl group and a monocyclic aryl group of the benzene series, D represents the atoms necessary to complete a monocyclic arylene group containing from 6 to 8 carbon atoms, and Z represents the non-metallic atoms necessary to complete a heterocyclic nucleus of the oxazole series.

16. A photographic silver halide developing-out emulsion sensitized with a merocyanine dye represented by the following formula:

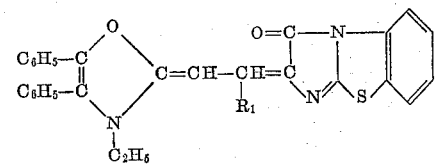

References Cited in the file of this patent

UNITED STATES PATENTS

| | | |
|---|---|---|
| 2,165,338 | Brooker et al. | July 11, 1939 |
| 2,216,441 | Keyes | Oct. 1, 1940 |
| 2,464,780 | Anish | Mar. 22, 1949 |
| 2,514,649 | Knott | July 11, 1950 |
| 2,706,193 | Sprague | Apr. 12, 1955 |
| 2,739,147 | Keyes | Mar. 20, 1956 |

OTHER REFERENCES

Chemical Abstracts, 16, p. 3101. Abstract of Brit. Med. Journal, 1922, I, pp. 514–515.

Chemical Abstracts, 19, p. 530. Abstract of Pros. Roy. Soc., London, 96B, pp. 317–333, 1924.

UNITED STATES PATENT OFFICE
CERTIFICATION OF CORRECTION

Patent No. 3,033,681

May 8, 1962

Edward B. Knott

It is hereby certified that error appears in the above numbered patent requiring correction and that the said Letters Patent should read as corrected below.

Column 11, lines 10 to 15, the left-hand portion of the formula should appear as shown below instead of as in the patent:

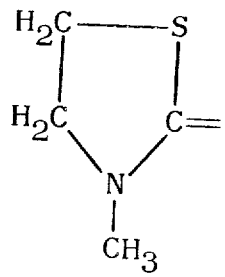

same column 11, lines 20 to 25, the right-hand portion of the formula should appear as shown below instead of as in the patent:

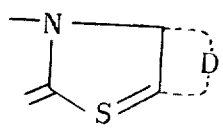

Signed and sealed this 18th day of September 1962.

(SEAL)
Attest:

ERNEST W. SWIDER
Attesting Officer

DAVID L. LADD
Commissioner of Patents